United States Patent
Tsuyumoto et al.

(10) Patent No.: US 7,820,281 B2
(45) Date of Patent: Oct. 26, 2010

(54) PROCESS FOR PRODUCING POROUS FILM AND POROUS FILM

(75) Inventors: Michio Tsuyumoto, Himeji (JP); Yo Yamato, Himeji (JP)

(73) Assignee: Daicel Chemical Industries, Ltd., Osaka-shi (JP)

( * ) Notice: Subject to any disclaimer, the term of this patent is extended or adjusted under 35 U.S.C. 154(b) by 0 days.

(21) Appl. No.: 10/534,411

(22) PCT Filed: Aug. 19, 2003

(86) PCT No.: PCT/JP03/10426

§ 371 (c)(1),
(2), (4) Date: May 11, 2005

(87) PCT Pub. No.: WO2004/043666

PCT Pub. Date: May 27, 2004

(65) Prior Publication Data

US 2006/0121267 A1 Jun. 8, 2006

(30) Foreign Application Priority Data

Nov. 12, 2002 (JP) .............................. 2002-328586

(51) Int. Cl.
*B32B 3/26* (2006.01)
*B32B 5/14* (2006.01)
*B32B 5/18* (2006.01)

(52) U.S. Cl. .............. 428/304.4; 428/308.4; 428/310.5; 428/315.5; 428/315.7

(58) Field of Classification Search .............. 428/304.4, 428/315.7, 315.5
See application file for complete search history.

(56) References Cited

U.S. PATENT DOCUMENTS

| 3,883,626 | A | * | 5/1975 | Kamide et al. | 264/49 |
| 3,929,971 | A | * | 12/1975 | Roy | 423/308 |
| 4,772,440 | A | | 9/1988 | Kasi et al. | |
| 4,970,034 | A | * | 11/1990 | Ly et al. | 264/46.4 |
| 6,596,406 | B2 | | 7/2003 | Ikeda et al. | |
| 2001/0023014 | A1 | * | 9/2001 | Patel et al. | 428/195 |

FOREIGN PATENT DOCUMENTS

| JP | 64-82909 A | 3/1989 |
| JP | 2-43911 A | 2/1990 |
| JP | 5-148383 A | 6/1993 |
| JP | 9-169867 A | 6/1997 |
| JP | 9-208736 A | 8/1997 |
| JP | 2000-260413 A | 9/2000 |
| JP | 2000-319442 A | 11/2000 |
| JP | 2001-67643 A | 3/2001 |
| JP | 2001-145826 A | 5/2001 |
| JP | 2002-37905 A | 2/2002 |
| JP | 2002-86476 A | 3/2002 |
| JP | 2002-120247 A | 4/2002 |
| JP | 2002-208781 A | 7/2002 |
| JP | 2003-26849 A | 1/2003 |
| JP | 2003-313356 A | 11/2003 |
| WO | WO 01/19906 A1 | 3/2001 |

OTHER PUBLICATIONS

Derwent Abstract of JP 48-097774 titled "Membranes ith small outer pores-for condensation or purificationof liquid materials", Dec. 12, 1973.*
Shigeru et al. Method and Apparatus for Continuously Manufacturing Poros Film, Machine traslation of JP 2002-086476, Mar. 26, 2002.*
Shigeru et al. Continuous Production Method and Continuous Production Apparatus for Porous Membrane. English traslation of JP 2002-086476, Mar. 26, 2002.*
Masayuki et al., "Porous Film and Battery Separator Used Therewith", Machine Translation of JP 2000-306568, Nov. 2, 2000.*
Michio, Tsuyumoto, "Porous Film and Its Manufacturing Method", Machine Translation of JP 2003-313356, Nov. 6, 2003.*
Kimio et al., "Porous Polyimide Film", Machine Translation of JP 2003-026849, Jan. 29, 2003.*
Nagoya Fujiharu et al., "Microporous Film and Its Production", Machine Translation of JP 09-169867, Jun. 30, 1997.*
Takehata Koji, "Polysulfone-Based Porous Film and Its Production", Machine Translation of JP 05-148383, Jun. 15, 1993.*
Tawara Shinji et al., "Porous Film for Prepreg and Prepreg for Circuit Board", Machine translation of JP 2002-037905, Feb. 6, 2002.*
Ikeda Kenichi et al., "Wiring Board Prepreg and Its Manufacturing Method", Machine translation of JP 2002-208781, Application Publication Date Jul. 26, 2002.*

* cited by examiner

*Primary Examiner*—Callie E Shosho
*Assistant Examiner*—Anish Desai
(74) *Attorney, Agent, or Firm*—Birch, Stewart, Kolasch & Birch, LLP

(57) ABSTRACT

A porous film of the invention is a porous film having a large number of continuous micropores. The film has a thickness of 5 to 200 μm, has an average surface pore size A of 0.01 to 10 μm, an average surface porosity C, and has an average inside pore size B and an average inside porosity D. The ratio A/B of A to B is 0.3 to 3. The porous film is produced by casting a polymer solution containing a polymer onto a substrate to form a film and subjecting the film to phase conversion to thereby form a porous film. In the method, the polymer constituting the porous film has a surface tension Sa [mN/m], the substrate has a surface tension Sb [mN/m], and Sa and Sb satisfy the following condition: Sa−Sb≧−10.

11 Claims, No Drawings

PROCESS FOR PRODUCING POROUS FILM AND POROUS FILM

TECHNICAL FIELD

The present invention relates to porous films that are substantially free from a skin layer (compact layer) on their surfaces and have a large number of continuous micropores. The porous films can be used for membrane separation techniques such as microfiltration and separation-concentration and can be used as a wide variety of substrate materials such as cell separators, electrolytic capacitors and circuit substrates by utilizing the properties of pores as intact or by charging the pores with a functional material.

BACKGROUND ART

Certain polymeric compounds such as amide-imide polymers, imide polymers, sulfone polymers, fluorocarbon polymers and olefin polymers are known as materials for constituting porous films. Porous films are produced from these materials, for example, by a phase conversion technique in which a mixture containing the polymeric compound is cast as a film and the film is brought to a solidifying liquid. The resulting film produced by the phase conversion technique using the polymeric compound as a material, however, has a skin layer (compact layer) on its surface and contains substantially no hole area (opening) or contains some openings with a low rate of hole area. Porous films using a polyimide, a kind of imide polymers, as a material and production thereof, for example, are disclosed in Japanese Unexamined Patent Application Publication No. 2001-67643, No. 2001-145826 and No. 2000-319442. These films, however, must be produced using a control member for a solvent replacement rate, thereby require complicated production processes and have insufficient rates of hole area and permeability.

DISCLOSURE OF INVENTION

Accordingly, an object of the present invention is to provide a porous film having a high rate of hole area at its surfaces and containing homogenous micropores overall from the surfaces to the inside thereof.

Another object of the present invention is to provide a method for easily and conveniently producing the porous film.

After intensive investigations to achieve the objects, the present inventors have found that a porous film having homogenous micropores with a high rate of hole area even on a surface of the film which has been in contact with a substrate can be prepared by casting a solution mixture containing a polymer onto a substrate to form a film and subjecting the film to phase conversion, in which the difference in surface tension between the polymer and the substrate is at a specific level or more. The present invention has been achieved based on these findings.

Specifically, the present invention provides a method for producing a porous film, including the steps of casting a polymer solution containing at least one polymer onto a substrate to form a film; and subjecting the film to phase conversion to thereby form a porous film, in which the polymer constituting the porous film has a surface tension Sa [mN/m], the substrate has a surface tension Sb [mN/m], and Sa and Sb satisfy the following condition: $Sa-Sb \geq -10$.

The method may produce a porous film by casting a solution mixture as the polymer solution onto the substrate to form a film, and subjecting the film to phase conversion by bringing the film to a solidifying liquid to thereby form a porous film, in which the solution mixture contains 8 to 25 percent by weight of a polymer component for constituting the porous film, 10 to 50 percent by weight of a water-soluble polymer, 0 to 10 percent by weight of water and 30 to 82 percent by weight of a water-soluble polar solvent. In addition or alternatively, the method may further include the steps of holding the cast film in an atmosphere at a relative humidity of 70% to 100% and a temperature of 15° C. to 90° C. for 0.2 to 15 minutes, and bringing the film to a solidifying liquid comprising a nonsolvent for the polymer component.

The present invention further provides a porous film having a large number of continuous micropores, in which the film has a thickness of 5 to 200 μm, has an average surface pore size A of 0.01 to 10 μm and an average rate of surface hole area C and has an average inside pore size B and an average rate of inside hole area D, the ratio A/B of A to B is in the range of 0.3 to 3 and the ratio C/D of C to D is in the range of 0.7 to 1.5.

In addition, the present invention provides a porous film having a large number of continuous micropores, in which the film has a thickness of 5 to 200 μm, has an average pore size $A^1$ of 0.01 to 10 μm at one surface, an average pore size $A^2$ of 0.01 to 10 μm at the other surface, an average rate of hole area $C^1$ of 48% or more at one surface, and an average rate of hole area $C^2$ of 48% or more at the other surface, the ratio $A^1/A^2$ of $A^1$ to $A^2$ is in the range of 0.3 to 3, and the ratio $C^1/C^2$ of $C^1$ to $C^2$ is in the range of 0.7 to 1.5.

The production method of the present invention can easily and conveniently produce a porous film having homogenous micropores with an improved rate of hole area even at a surface which has been in contact with a substrate, since a solution mixture containing a polymer component forms a satisfactory phase separation structure on the substrate. The porous film of the present invention can be used for membrane separation techniques such as microfiltration and separation-concentration and can be used as a wide variety of substrate materials such as cell separators, electrolytic capacitors and circuit substrates by charging the pores with a functional material.

BEST MODE FOR CARRYING OUT THE INVENTION

The method of the present invention produces a porous film by casting a polymer solution containing a polymer component as a material for constituting the porous film onto a substrate to form a film and subjecting the film to phase conversion.

The polymer component includes, but is not limited to, polymers such as amide-imide polymers, imide polymers, amide polymers, sulfone polymers, cellulosic polymers, acrylic polymers, fluorocarbon polymers and olefinic polymers. Among them, polymer components being soluble in a water-soluble polar solvent and capable of forming a film by phase conversion are preferred. Examples of such preferred polymers are amide-imide polymers, imide polymers, polyethersulfones, polysulfones, acrylic polymers and cellulose acetate. Each of these polymer components can be used alone or in combination.

Examples of the substrate are glass plate; plastic sheets made of, for example, polyolefins such as polyethylenes, polypropylenes and polymethylpentenes, nylons (polyamides), polyesters such as poly(ethylene terephthalate)s (PET), polycarbonates, styrenic resins, fluorocarbon resins such as polytetrafluoroethylenes (PTFE) and poly(vinylidene fluoride)s (PVDF), vinyl chloride resins and other resins;

metal plates such as stainless steel plate and aluminum plate. The substrate may be a composite plate or sheet comprising a surface layer and a core, the surface layer and the core comprising different materials from each other.

A main feature of the present invention is to produce a porous film by using a polymer and a substrate, in which the polymer constituting the porous film has a surface tension Sa [mN/m (=dyn/cm)], the substrate has a surface tension Sb [mN/m (=dyn/cm)], and Sa and Sb satisfy the following condition: Sa—Sb≧−10. If the substrate is a composite plate comprising a surface layer and a core comprising different materials from each other, only the material to form a contact surface with the polymer has to have a surface tension satisfying the requirement. If the difference (Sa−Sb) is less than −10, the resulting film has a low rate of surface hole area and cannot be practically used, since the polymer coagulates at the interface between the polymer and the substrate to thereby form a compact phase.

By using such a polymer and a substrate satisfying the above-specified condition, the solution mixture containing the polymer undergoes phase separation to form an islands-in-sea structure on the substrate, which results in micropores of the resulting film. This specifically yields a porous film having a high rate of hole area especially at a surface which has been in contact with the substrate (hereinafter may be referred to as "substrate-side surface of the film"). The difference (Sa−Sb) is preferably more than 0, more preferably 3 or more, further preferably 7 or more, and specifically preferably 13 or more for better opening (porosity), since the polymer coagulated as a result of phase conversion cannot wet the surface of the substrate and is rejected under such conditions. The upper limit of the difference (Sa−Sb) is not specifically limited and can be, for example, about 100.

The polymer solution to be cast for use in the present invention is, for example, preferably a solution mixture comprising 8 to 25 percent by weight of a polymer component for constituting the porous film, 10 to 50 percent by weight of a water-soluble polymer, 0 to 10 percent by weight of water and 30 to 82 percent by weight of a water-soluble polar solvent. An excessively low concentration of the polymer component may invite a reduced strength of the film. An excessively high concentration of the polymer component may decrease the porosity. The water-soluble polymer is added to form a homogenous spongy porous structure inside the film. An excessively low concentration of the water-soluble polymer may invite giant voids with a size exceeding, for example, 10 μm inside the film and invite a decreased uniformity of the pores. An excessively high concentration of the water-soluble polymer may invite a decreased solubility. If the concentration exceeds 50 percent by weight, the film may have a decreased strength.

Examples of the water-soluble polar solvent are dimethyl sulfoxide, N,N-dimethylformamide, N,N-dimethylacetamide (DMAc), N-methyl-2-pyrrolidone (NMP), 2-pyrrolidone, and mixtures of these solvents. A solvent corresponding to the chemical structure of the polymer used as the polymer component and capable of dissolving the polymer (a good solvent for the polymer component) can be used. Each of these solvents can be used alone or in combination.

The water-soluble polymer and water are added so as to control the phase separation structure upon casting to thereby form a spongy, porous film structure. Examples of the water-soluble polymer are polyethylene glycol, polyvinylpyrrolidones, poly(ethylene oxide)s, poly(vinyl alcohol)s, poly(acrylic acid)s, polysaccharides, and derivatives of these polymers. Each of these water-soluble polymers can be used alone or in combination. Among them, polyvinylpyrrolidones are preferred for yielding satisfactorily continuous micropores in the film. The molecular weight of the water-soluble polymer is preferably 1000 or more, more preferably 5000 or more, specifically preferably 10000 or more, and especially preferably from about 10000 to about 200000, for forming a satisfactorily porous structure. The size of voids can be controlled by changing the amount of water. The size can increase with an increasing amount of water.

Homogenous micropores can be formed by casting a solution mixture having the above composition as the polymer solution onto a substrate to form a film, and subjecting the film to phase conversion by bringing the film to a solidifying liquid.

It is preferred that the cast film is held in an atmosphere at relative humidity of 70% to 100% and temperatures of 15° C. to 90° C. for 0.2 to 15 minutes, and the film is brought to a solidifying liquid comprising a nonsolvent for the polymer component. The cast film is more preferably held at relative humidity of 90% to 100% and temperatures of 30° C. to 80° C., and specifically preferably at relative humidity of about 100% (e.g., 95% to 100%) and temperatures of 40° C. to 70° C. If the moisture content in the atmosphere is less than the above-specified range, the resulting film may have an insufficient rate of hole area.

By keeping the cast film under the above-mentioned condition, the film can have an increased rate of hole area specifically on a surface opposite to the substrate-side surface of the film (hereinafter may be referred to as "air-side surface of the film"). The rate of hole area is increased provably because water (moisture) migrates from the surface into the core of the film and efficiently accelerates the phase separation of the solution mixture by holding the cast film under a humidified condition.

The solidifying liquid for use in the phase conversion can be any solvent that serves to solidify the polymer component and is selected corresponding to the type of the polymer component. Examples of the solidifying liquid are water; alcohols including monohydric alcohols such as methanol and ethanol, and polyhydric alcohols such as glycerol; water-soluble polymers such as polyethylene glycol; and mixture of these substances.

The method of the present invention can produce a porous film having homogenous micropores with a high rate of hole area. The porous film produced by the method of the present invention will be illustrated below.

The thickness of the porous film is, for example, from 5 to 200 μm, preferably from 10 to 100 μm and more preferably from 20 to 80 μm. An excessively small thickness may invite insufficient mechanical strength of the film, and an excessively large thickness may fail to control the pore size distribution uniformly.

The average pore size of micropores in the porous film, i.e., the average pore size at the film surface, may vary depending on the use of the film and is generally from 0.01 to 10 μm, and preferably from 0.05 to 5 μm. An excessively small size may invite a decreased permeation capability of the film, and an excessively large size may invite a decreased efficiency in separation and concentration. A functional material, if used, is preferably charged into the pores with a resolution on the order of submicrons to microns, and the above-specified average pore size is preferred for this purpose. If the average pore size is excessively small, the functional material may not be charged. If it is excessively large, the control on the order of submicrons to microns may be difficult. The maximum pore size at the film surface is preferably 15 μm or less.

The average rate of hole area inside the porous film (rate of inside hole area; porosity) is, for example, from 30% to 80%, preferably from 40% to 80% and more preferably from 45% to 80%. An excessively low porosity may invite insufficient permeation capability of the film or insufficient action of the functional material, if charged. In contrast, an excessively high porosity may invite deteriorated mechanical strength. The average rate of hole area at the film surface (rate of surface hole area) is, for example, 48% or more (e.g., 48% to 80%) and preferably from about 60% to about 80%. An excessively low rate of surface hole area may invite insufficient permeation capability of the film or insufficient action of the functional material, if charged. In contrast, an excessively high rate of surface hole area may invite decreased mechanical strength.

The continuity of the micropores of the film can be indicated, for example, in terms of a Gurley permeability as a gas permeability and by a pure-water permeation rate. The Gurley permeability of the porous film is, for example, from 0.2 to 29 seconds per 100 cc, preferably from 1 to 25 seconds per 100 cc, and specifically preferably from 1 to 18 seconds per 100 cc. If the Gurley permeability exceeds the above-specified range, the film may have insufficient permeability upon actual use and/or the functional material may not be sufficiently charged into the pores and may not sufficiently exhibit its function. If the Gurley permeability is less than the above-specified range, the film may have deteriorated mechanical strength. The pure-water permeation rate is, for example, from $1.3 \times 10^{-9}$ to $1.1 \times 10^{-7}$ m·sec$^{-1}$·Pa$^{-1}$ [=8 to 700 liter/(m$^2$·min·atm)], preferably from $3.3 \times 10^{-9}$ to $1.1 \times 10^{-7}$ m·sec$^{-1}$·Pa$^{-1}$ [=20 to 700 liter/(m$^2$·min·atm)] and more preferably from $4.9 \times 10^{-9}$ to $8.2 \times 10^{-8}$ m·sec$^{-1}$·Pa$^{-1}$ [=30 to 500 liter/(m$^2$·min·atm)]. If the pure-water permeation rate is less than the above-specified range, the film may have insufficient permeability upon actual use and/or the functional material may not be sufficiently charged into the pores and may not sufficiently exhibit its function. If it exceeds the above-specified range, the film may have deteriorated mechanical strength.

The porous film is, in one embodiment, preferably a porous film having a large number of continuous micropores, wherein the film has a thickness of 5 to 200 µm, has an average surface pore size A of 0.01 to 10 µm and an average rate of surface hole area C and has an average inside pore size B and an average rate of inside hole area D, in which the ratio A/B of A to B is in the range of 0.3 to 3, and the ratio C/D of C to D is in the range of 0.7 to 1.5.

The ratio A/B of the average surface pore size A to the average inside pore size B and the ratio C/D of the average rate of surface hole area C to the average rate of inside hole area D are preferably from 0.5 to 2 and from 0.75 to 1.4, respectively, and more preferably from 0.6 to 1.5 and from 0.8 to 1.3, respectively. If these ratios are excessively low, the film may have a deteriorated permeation capability and/or may contain the functional material insufficiently charged. If they are excessively high, the film may have a deteriorated separation capability and/or may contain the functional material heterogeneously charged.

In another embodiment, the porous film is preferably a porous film having a large number of continuous micropores, wherein the film has a thickness of 5 to 200 µm, has an average pore size $A^1$ of 0.01 to 10 µm at one surface (e.g., the substrate-side surface), an average pore size $A^2$ of 0.01 to 10 µm at the other surface (e.g., the air-side surface), an average rate of hole area $C^1$ of 48% or more at one surface, and an average rate of hole area $C^2$ of 48% or more at the other surface, in which the ratio $A^1/A^2$ of $A^1$ to $A^2$ is in the range of 0.3 to 3, and the ratio $C^1/C^2$ of $C^1$ to $C^2$ is in the range of 0.7 to 1.5.

The ratio $A^1/A^2$ of the average pore size at one surface $A^1$ to the average pore size at the other surface $A^2$, and the ratio $C^1/C^2$ of the average rate of hole area at one surface $C^1$ to the average rate of hole area at the other surface $C^2$ are preferably from 0.5 to 2 and from 0.75 to 1.4, respectively, and more preferably from 0.6 to 1.5 and from 0.8 to 1.3, respectively. If these ratios are excessively low, the film may have a deteriorated permeation capability and/or may contain the functional material insufficiently charged. If they are excessively high, the film may have a deteriorated separation capability and/or may contain the functional material heterogeneously charged.

The pore size, porosity, gas permeability and rate of hole area of the micropores of the porous film can be controlled at desired levels by suitably selecting, for example, the substrate to be used, the type and amount of the water-soluble polymer, the amount of water, the humidity, temperature and time period in casting.

The method of the present invention can easily produce a porous film having, in terms of average pore size and average rate of hole area, ratios of the surface to the inside and the ratios of the substrate-side surface to the air-side surface within the above-specified ranges.

EXAMPLES

The present invention will be illustrated in further detail with reference to several examples below, which are never intended to limit the scope of the invention. The surface tension and the properties of the resulting films were determined in the following manner. The results are shown in Table 1 (Table 1-1, Table 1-2), wherein "Sa–Sb" means the difference between the surface tension of a polymer constituting the film Sa and the surface tension of the substrate Sb. The symbol "–" means that pores have too indefinite shapes to determine the pore size.

Surface Tension

The surface tensions listed in POLYMER HANDBOOK (THIRD EDITION, JOHN WILEY & SONS) and Handbook of Chemical Engineering (revised 5th Ed., MARUZEN CO., LTD.) were used. The surface tension of a substance not listed in these books was determined by using a homogenous film of a sample polymer alone (or a polymer blend) according to Japanese Industrial Standards (JIS) K 6768. The surface tensions listed in the examples and determined by the latter method are indicated as "measured".

Gas Permeability

The gas permeability of a sample film was determined using a Gurley's Densometer available from YOSHIMITSU according to the method described in JIS P 8117. In the procedure, the Gurley's Densometer used is of one-tenth scale in measuring area as compared with the standard, and the measured value was converted into a standard Gurley permeability according to Appendix 1 of JIS P 8117.

Pure-Water Permeation Rate

The pure-water permeation rate was determined using a filter STIRRED ULTRAFILTRATION CELLS MODELS 8200 available from Amicon with a permeation area of 28.7 cm$^2$. In the determination, the resistance on the permeation side was eliminated as far as possible by placing a filter paper instead of a spacer at the permeation side. The pressure was set at 0.5 kg/cm$^2$ and the measured value was converted. The temperature was set at 25° C. in determination.

Average Surface Pore Size A

The areas of arbitrary thirty or more pores at a surface of a sample film were determined, and the average thereof was defined as an average pore area $S_{ave}$. The average pore area was converted into a pore size (pore diameter) according to the following equation, assuming that the pores are perfect circles in profile, and the converted pore size was defined as the average pore size. In the equation, the symbol "π" represents the ratio of the circumference of a circle to its diameter.

Surface Average Pore Size $A = 2 \times (S_{ave}/\pi)^{1/2}$

Average Inner Pore Size B

A sample film was broken at temperatures of liquid nitrogen, and a section of the film was exposed. When the sample film was not broken according to this method, the film was wetted with water and was then broken at temperatures of liquid nitrogen to thereby expose the section thereof. The average pore size was determined in the same way as the above average surface pore size by using the section of the film as a sample for electron microscopy.

Maximum Surface Pore Size

Arbitrary five 20-μm square points were selected from an electron micrograph of the surface of a sample film. The diameters of pores at the five points were converted into pore sizes according to the following equation, assuming that the pores are perfect circles, and the largest one was defined as the maximum pore size. In the equation, $S_{max}$ is the largest area (maximum area) of measured pores, and symbol "π" represents the ratio of the circumference of a circle to its diameter.

Pore Size $= 2 \times (S_{max}/\pi)^{1/2}$

Maximum Inner Pore Size

A sample film was broken at temperatures of liquid nitrogen, and a section of the film was exposed. When the sample film was not broken according to this method, the film had been wetted with water and was broken at temperatures of liquid nitrogen to thereby expose the section thereof. The maximum pore size was then determined in the same way as the above maximum surface pore size by using the section of the film as a sample for electron microscopy.

Average Rate of Surface Hole Area C

An arbitrary 20-μm square area was selected from an electron micrograph of the surface of a sample film. The ratio of the total area of pores in the selected area to the total area was determined by calculation. This procedure was carried out at arbitrary five points, and the average thereof was determined as the average rate of surface hole area.

Average Rate of Inner Hole Area D (Porosity)

The average rate of inner hole area of a sample film was determined according to the following equation, wherein V is the volume of the film; W is the weight of the film; and ρ is the density of a material for the film. The densities of a poly (amide imide), a polyethersulfone and a blend of a poly (amide imide) and a polyethersulfone used in Example 6 were 1.45 (g/cm³), 1.37 (g/cm³) and 1.43 (g/cm³), respectively.

Average Rate of Inner Hole Area D (%) $= 100 - 100 \times W/(\rho \cdot V)$

The average pore sizes, maximum pore sizes and average rates of hole area were determined only on a most front micropore in the electron microphotograph, and the other micropores in the electron micrograph were excluded in determination.

Example 1

A solution of an amide-imide polymer "VYLOMAX HR11NN" (trade name of a product of Toyobo Co., Ltd.) having a measured surface tension as the polymer alone of 42 mN/m (=dyn/cm), a solid content of 15 percent by weight, containing NMP as a solvent and having a viscosity as a solution of 20 dPa·s at 25° C. was used. A total of 30 parts by weight of a polyvinylpyrrolidone having a molecular weight of $5 \times 10^4$ as a water-soluble polymer was added to 100 parts by weight of the solution to thereby yield a composition for film formation. The composition was cast onto a Teflon (registered trademark) substrate having a surface tension of 24 mN/m (=dyn/cm) using a film applicator at a temperature of 30° C. and relative humidity of 80%. Immediately after casting, the cast film on the substrate was held in a container at a temperature of 45° C. and humidity of about 100% for four minutes. The film was solidified by immersing in water, was dried and thereby yielded a porous film. The distance (gap) between the film applicator and the Teflon (registered trademark) substrate in casting was set at 127 μm, and the film had a thickness of about 50 μm.

The structure of the resulting film was observed. A surface of the film which had been in contact with the substrate upon casting (substrate-side surface of the film) contained pores having an average pore size $A^1$ of about 0.9 μm, a maximum pore size of 2.5 μm and an average rate of hole area $C^1$ of about 65%. Another surface of the film which had not been in contact with the substrate upon casting (air-side surface of the film) contained pores having an average pore size $A^2$ of about 1.1 μm, a maximum pore size of 2.7 μm and an average rate of hole area $C^2$ of about 70%. The inside of the film was substantially homogenous and entirely contained continuous micropores having an average pore size B of about 1.0 μm and a maximum pore size of about 1.8 μm with an average rate of inner hole area D of 70%. The permeation capability of the film was determined to find that the film had superior permeation capabilities in terms of a Gurley permeability of 9.5 seconds and a pure-water permeation rate of $9.8 \times 10^{-9}$ m·sec$^{-1}$·Pa$^{-1}$ [=60 liter/(m²·min·atm at 25° C.)].

Example 2

A film was prepared by the procedure of Example 1, except for using a polypropylene substrate having a surface tension of 29 mN/m (=dyn/cm) as a substrate for casting instead of the Teflon (registered trademark) substrate.

The structure of the resulting film was observed. The substrate-side surface of the film contained pores having an average pore size $A^1$ of about 0.7 μm, a maximum pore size of 1.8 μm and an average rate of hole area $C^1$ of about 50%. The air-side surface of the film contained pores having an average pore size $A^2$ of about 1.0 μm, a maximum pore size of 2.5 μm and an average rate of hole area $C^2$ of about 70%. The inside of the film was substantially homogeneous and entirely contained continuous micropores having an average pore size B of about 1.0 μm and a maximum pore size of about 2.0 μm with an average rate of inner hole area D of about 70%. The permeation capability of the film was determined to find that the film had superior permeation capabilities in terms of a Gurley permeability of 10.0 seconds and a pure-water permeation rate of $9.0 \times 10^{-9}$ m·sec$^{-1}$·Pa$^{-1}$ [=55 liter/(m²·min·atm at 25° C.)].

Example 3

A film was prepared by the procedure of Example 1, except for using a poly(ethylene terephthalate) (PET) sheet having a measured surface tension of 39 mN/m (=dyn/cm) (a product of DuPont Teijin Films, Ltd.; Type S) as a substrate for casting instead of the Teflon (registered trademark) substrate.

The structure of the resulting film was observed. The substrate-side surface of the film contained pores having an average pore size $A^1$ of about 0.9 μm, a maximum pore size of 2.5

μm and an average rate of hole area $C^1$ of about 70%. The air-side surface of the film contained pores having an average pore size $A^2$ of about 1.0 μm, a maximum pore size of 2.7 μm and an average rate of hole area $C^2$ of about 70%. The inside of the film was substantially homogenous and entirely contained continuous micropores having an average pore size B of about 1.0 μm and a maximum pore size of about 2.0 μm with an average rate of inner hole area D of about 70%. The permeation capability of the film was determined to find that the film had superior permeation capabilities in terms of a Gurley permeability of 10.0 seconds and a pure-water permeation rate of $9.0 \times 10^{-9}$ m·sec$^{-1}$·Pa$^{-1}$ [=55 liter/(m$^2$·min·atm at 25° C.)].

Example 4

A film was prepared by the procedure of Example 2, except for using a mixture of 15 parts by weight of a polyethersulfone (a product of Sumitomo Chemical Co., Ltd. under the trade name of "5200 P") having a measured surface tension of 46 mN/m (=dyn/cm), 10 parts by weight of a polyvinylpyrrolidone having a molecular weight of $36 \times 10^4$ and 75 parts by weight of NMP as a composition for film formation.

The structure of the resulting film was observed. The substrate-side surface of the film contained pores having an average pore size $A^1$ of about 1.3 μm, a maximum pore size of 2.5 μm and an average rate of hole area $C^1$ of about 65%. The air-side surface of the film contained pores having an average pore size $A^2$ of about 0.8 μm, a maximum pore size of 1.7 μm and an average rate of hole area $C^2$ of about 50%. The inside of the film was substantially homogenous and entirely contained continuous micropores having an average pore size B of about 2.0 μm and a maximum pore size of about 3.0 μm with an average rate of inner hole area D of about 70%. The permeation capability of the film was determined to find that the film had superior permeation capabilities in terms of a Gurley permeability of 29 seconds and a pure-water permeation rate of $3.3 \times 10^{-9}$ m·sec$^{-1}$·Pa$^{-1}$ [=20 liter/(m$^2$·min·atm at 25° C.)].

Example 5

A film was prepared by the procedure of Example 4, except for using a poly(ethylene terephthalate) (PET) sheet having a measured surface tension of 39 mN/m (=dyn/cm) (a product of DuPont Teijin Films, Ltd.; Type S) as a substrate for casting instead of the polypropylene substrate.

The structure of the resulting film was observed. The substrate-side surface of the film contained pores having an average pore size $A^1$ of about 2.3 μm, a maximum pore size of 3.6 μm and an average rate of hole area $C^1$ of about 65%. The air-side surface of the film contained pores having an average pore size $A^2$ of about 0.8 μm, a maximum pore size of 1.7 μm and an average rate of hole area $C^2$ of about 50%. The inside of the film was substantially homogenous and entirely contained continuous micropores having an average pore size B of about 2.0 μm and a maximum pore size of 5.1 μm with an average rate of inner hole area D of about 70%. The permeation capability of the film was determined to find that the film had superior permeation capabilities in terms of a Gurley permeability of 27 seconds and a pure-water permeation rate of $3.9 \times 10^{-9}$ m·sec$^{-1}$·Pa$^{-1}$ [=24 liter/(m$^2$·min·atm at 25° C.)].

Example 6

Composition A was prepared by mixing 100 parts by weight of a solution of an amide-imide polymer "VYLOMAX HR11NN" (trade name of a product of Toyobo Co., Ltd.) having a measured surface tension as the polymer alone of 42 mN/m (=dyn/cm), a solid content of 15 percent by weight, containing NMP as a solvent and having a viscosity as a solution of 20 dpa·s at 25° C. and 25 parts by weight of a polyvinylpyrrolidone having a molecular weight of $5 \times 10^4$. Composition B was prepared by adding 85 parts by weight of NMP to 15 parts by weight of a polyethersulfone (a product of Sumitomo Chemical Co., Ltd. under the trade name of "5200 P") having a measured surface tension of 46 mN/m (=dyn/cm) to yield a mixture, and adding 25 parts by weight of a polyvinylpyrrolidone having a molecular weight of $5 \times 10^4$ to 100 parts by weight of the mixture.

A film was prepared by the procedure of Example 2, except for using, as a composition for film formation, a 3:1 (by weight) mixture of an amide-imide polymer and a polyethersulfone, i.e., a 3:1 (by weight) mixture of Composition A and Composition B, as a blend polymer having a measured surface tension of 45 mN/m (=dyn/cm).

The structure of the resulting film was observed. The substrate-side surface of the film contained pores having an average pore size $A^1$ of about 0.9 μm, a maximum pore size of 1.8 μm and an average rate of hole area $C^1$ of about 70%. The air-side surface of the film contained pores having an average pore size $A^2$ of about 2.0 μm, a maximum pore size of 4.4 μm and an average rate of hole area $C^2$ of about 70%. The inside of the film was substantially homogenous and entirely contained continuous micropores having an average pore size B of about 2.0 μm and a maximum pore size of about 3.0 μm with an average rate of inner hole area D of about 70%. The permeation capability of the film was determined to find that the film had superior permeation capabilities in terms of a Gurley permeability of 9.3 seconds and a pure-water permeation rate of $1.1 \times 10^{-8}$ m·sec$^{-1}$·Pa$^{-1}$ [=24 liter/(m$^2$·min·atm at 25° C.)].

Comparative Example 1

A film was prepared by the procedure of Example 1, except for using a glass substrate having a surface tension of 100 mN/m (=dyn/cm) as a substrate for casting instead of the Teflon (registered trademark) substrate.

The structure of the resulting film was observed. The substrate-side surface of the film contained pores having an average pore size $A^1$ of about 0.3 μm, a maximum pore size of 0.6 μm and an average rate of hole area $C^1$ of about 40%. The air-side surface of the film contained pores having an average pore size $A^2$ of about 1.0 μm, a maximum pore size of 2.5 μm and an average rate of hole area $C^2$ of about 70%. The inside of the film was substantially homogenous and entirely contained continuous micropores having an average pore size B of about 1.0 μm and a maximum pore size of about 2.0 μm with an average rate of inner hole area D of about 70%. These results show that the film has micropores at the substrate-side surface thereof having dimensions and a rate of hole area smaller than those of micropores at the air-side surface and inside the film, and that the film as a whole lacks uniformity.

Comparative Example 2

A film was prepared by the procedure of Example 1, except for using an aluminum substrate having a surface tension of 914 mN/m (=dyn/cm) as a substrate for casting instead of the Teflon (registered trademark) substrate.

The structure of the resulting film was observed. The substrate-side surface of the film contained pores having too irregular shapes to determine the average pore size $A^1$. The average rate of hole area $C^1$ was estimated as 10% or less. The air-side surface of the film contained pores having an average pore size $A^2$ of about 1.3 µm, a maximum pore size of 2.7 µm and an average rate of hole area $C^2$ of about 70%. The inside of the film was substantially homogenous and entirely contained continuous micropores having an average pore size B of about 1.2 µm and a maximum pore size of about 2.2 µm with an average rate of inner hole area D of about 70%. These results show that the substrate-side surface of the film has a low rate of hole area and has peculiar dimensions as compared with the air-side surface and the inside of the film, and that the film as a whole lacks uniformity.

Comparative Example 3

A film was prepared by the procedure of Example 4, except for using a glass substrate having a surface tension of 100 mN/m (=dyn/cm) as a substrate for casting.

The structure of the resulting film was observed. The substrate-side surface of the film contained pores having an average pore size $A^1$ of about 1.2 µm, a maximum pore size of 2.0 µm and an average rate of hole area $C^1$ of 10% or less. The air-side surface of the film contained pores having an average pore size $A^2$ of about 0.8 µm, a maximum pore size of 1.9 µm and an average rate of hole area $C^2$ of about 50%. The inside of the film entirely contained continuous micropores having an average pore size B of about 2.0 µm and a maximum pore size of about 3.5 µm with an average rate of inner hole area D of about 70%. These results show that the film has micropores at the substrate-side surface thereof having a low rate of hole area and that the film as a whole lacks uniformity.

Comparative Example 4

A film was prepared by the procedure of Example 4, except for using an aluminum substrate having a surface tension of 914 mN/m (=dyn/cm) as a substrate for casting instead of the Teflon (registered trademark) substrate.

The structure of the resulting film was observed. The substrate-side surface of the film contained pores having too irregular shapes to determine the average pore size $A^1$. The average rate of hole area $C^1$ was estimated as 10% or less. The air-side surface of the film contained pores having an average pore size $A^2$ of about 0.9 am, a maximum pore size of 2.1 µm and an average rate of hole area $C^2$ of about 50%. The inside of the film entirely contained continuous micropores having an average pore size B of about 2.2 µm and a maximum pore size of about 3.6 µm with an average rate of inner hole area D of about 70%. These results show that the film has micropores at the substrate-side surface thereof having dimensions and a rate of hole area smaller than those of micropores at the air-side surface and inside the film, and that the film as a whole lacks uniformity.

TABLE 1-1

| | | Substrate-side surface | | | Air-side surface | | | Inside | | |
|---|---|---|---|---|---|---|---|---|---|---|
| | Sa-Sb [dyn/cm] | Average pore size $A^1$ [µm] | Maximum pore size [µm] | Average rate of hole area $C^1$ [%] | Average pore size $A^2$ [µm] | Maximum pore size [µm] | Average rate of hole area $C^2$ [%] | Average pore size B [µm] | Maximum pore size [µm] | Average rate of hole area D [%] |
| Ex. 1 | 18 | 0.9 | 2.5 | 65 | 1.1 | 2.7 | 70 | 1.0 | 1.8 | 70 |
| Ex. 2 | 13 | 0.7 | 1.8 | 50 | 1.0 | 2.5 | 70 | 1.0 | 2.0 | 70 |
| Ex. 3 | 3 | 0.9 | 2.5 | 70 | 1.0 | 2.7 | 70 | 1.0 | 2.0 | 70 |
| Ex. 4 | 17 | 1.3 | 2.5 | 65 | 0.8 | 1.7 | 50 | 2.0 | 3.0 | 70 |
| Ex. 5 | 7 | 2.3 | 3.6 | 65 | 0.8 | 1.7 | 50 | 2.0 | 5.1 | 70 |
| Ex. 6 | 16 | 0.9 | 1.8 | 70 | 2.0 | 4.4 | 70 | 2.0 | 3.0 | 70 |
| Com. Ex. 1 | −58 | 0.3 | 0.6 | 40 | 1.0 | 2.5 | 70 | 1.0 | 2.0 | 70 |
| Com. Ex. 2 | −872 | — | — | <10 | 1.3 | 2.7 | 70 | 1.2 | 2.2 | 70 |
| Com. Ex. 3 | −54 | 1.2 | 2.0 | <10 | 0.8 | 1.9 | 50 | 2.0 | 3.5 | 70 |
| Com. Ex. 4 | −868 | — | — | <10 | 0.9 | 2.1 | 50 | 2.2 | 3.6 | 70 |

TABLE 1-2

| | Surface/Inside | | | | Substrate-side/Air-side | |
|---|---|---|---|---|---|---|
| | Ratio of average pore size | | Ratio of average rate of hole area | | Ratio of average pore size $A^1/A^2$ | Ratio of average rate of hole area $C^1/C^2$ |
| | Surface-side $A^1$/B | Air-side $A^2$/B | Surface-side $C^1$/D | Air-side $C^2$/D | | |
| Ex. 1 | 0.9 | 1.1 | 0.93 | 1.0 | 0.82 | 0.93 |
| Ex. 2 | 0.7 | 1.0 | 0.71 | 1.0 | 0.70 | 0.71 |
| Ex. 3 | 0.9 | 1.0 | 1.0 | 1.0 | 0.90 | 1.0 |
| Ex. 4 | 0.65 | 0.4 | 0.93 | 0.71 | 1.63 | 1.3 |
| Ex. 5 | 1.15 | 0.4 | 0.93 | 0.71 | 2.88 | 1.3 |
| Ex. 6 | 0.45 | 1.0 | 1.0 | 1.0 | 0.45 | 1.0 |
| Com. Ex. 1 | 0.3 | 1.0 | 0.57 | 1.0 | 0.3 | 0.57 |
| Com. Ex. 2 | — | 1.1 | <0.14 | 1.0 | — | — |
| Com. Ex. 3 | 0.6 | 0.4 | <0.14 | 0.71 | 1.5 | — |
| Com. Ex. 4 | — | 0.41 | <0.14 | 0.71 | — | — |

INDUSTRIAL APPLICABILITY

The porous films of the present invention can be used for membrane separation techniques such as microfiltration and separation-concentration and can be used as a wide variety of substrate materials such as cell separators, electrolytic capacitors and circuit substrates by charging the pores with a functional material.

The invention claimed is:

1. A porous film having a number of continuous micropores, wherein the film has a thickness of 5 to 200 μm, has an average surface pore size A of 0.01 to 10 μm and an average surface porosity C and has an average inside pore size B and an average inside porosity D,
wherein the ratio A/B of A to B is in the range of 0.3 to 3,
wherein a maximum surface pore size is 15 μm or less; the ratio $A^1/A^2$ of an average pore size at one surface $A^1$ to an average pore size at the other surface $A^2$ is from 0.6 to 1.5; the average surface porosity C has an average porosity $C^1$ of 48% or more at one surface and an average porosity $C^2$ of 48% or more at the other surface; the average inside porosity D is from 45% to 80%; and the ratio C/D of C to D is in the range of 0.7 to 1.5,
wherein a polymer component forming the film comprises at least one selected from a group of amide-imide polymers, imide polymers, polyethersulfones, polysulfones, acrylic polymers or cellulose acetate,
wherein a Gurley permeability of the porous film is from 0.2 to 29 seconds per 100 cc, and
wherein the porous film is produced in a method comprising the steps of casting a polymer solution comprising a polymer onto a substrate to form a film; and subjecting the film to phase conversion to thereby form the porous film, wherein the polymer constituting the porous film has a surface tension Sa [mN/m], wherein the substrate has a surface tension Sb [mN/m], and wherein Sa and Sb satisfy the following condition: Sa−Sb≧−10.

2. The porous film according to claim 1, wherein the Gurley permeability of the porous film is from 1 to 25 seconds per 100 cc.

3. The porous film according to claim 1, wherein the Gurley permeability of the porous film is from 1 to 18 seconds per 100 cc.

4. The porous film according to claim 1, wherein the film has an average porosity $C^1$ of from 60% to 80% at one surface and an average porosity $C^2$ of from 60% to 80% at the other surface.

5. A method for producing the porous film according to claim 1, comprising the steps of casting a polymer solution comprising a polymer onto a substrate to form a film; and subjecting the film to phase conversion to thereby form the porous film, wherein the polymer constituting the porous film has a surface tension Sa [mN/m], wherein the substrate has a surface tension Sb [mN/m], and wherein Sa and Sb satisfy the following condition: Sa−Sb≧−10.

6. The method for producing the porous film according to claim 5, further comprising the steps of casting a solution mixture as the polymer solution onto the substrate to form a cast film, and subjecting the film to phase conversion by bringing the film to a solidifying liquid to thereby form the porous film, the solution mixture comprising 8 to 25 percent by weight of the polymer component for constituting the porous film, 10 to 50 percent by weight of a water-soluble polymer, 0 to 10 percent by weight of water and 30 to 82 percent by weight of a water-soluble polar solvent.

7. The method for producing the porous film according to one of claims 5 and 6, further comprising the steps of holding the cast film in an atmosphere at a relative humidity of 70% to 100% and a temperature of 15° C. to 90° C. for 0.2 to 15 minutes, and bringing the film to a solidifying liquid comprising a nonsolvent for the polymer component.

8. A porous film having a number of continuous micropores,
wherein the film has a thickness of 5 to 200 μm, has an average pore size $A^1$ of 0.01 to 10 μm at one surface, an average pore size $A^2$ of 0.01 to 10 μm at the other surface, an average porosity $C^1$ of 48% or more at one surface, and an average porosity $C^2$ of 48% or more at the other surface,
wherein the ratio $A^1/A^2$ of $A^1$ to $A^2$ is in the range of 0.6 to 1.5,
wherein the ratio $C^1/C^2$ of $C^1$ to $C^2$ is in the range of 0.7 to 1.5,
wherein a maximum surface pore size is 15 μm or less; the average inside porosity D is from 45% to 80%; the ratio C/D of C to D is in the range of 0.7 to 1.5,
wherein a polymer component forming the film comprises at least one selected from a group of amide-imide polymers, imide polymers, polyethersulfones, polysulfones, acrylic polymers or cellulose acetate,
wherein a Gurley permeability of the porous film is from 0.2 to 29 seconds per 100 cc, and
wherein the porous film is produced in a method comprising the steps of casting a polymer solution comprising a polymer onto a substrate to form a film; and subjecting the film to phase conversion to thereby form the porous film, wherein the polymer constituting the porous film has a surface tension Sa [mN/m], wherein the substrate has a surface tension Sb [mN/m], and wherein Sa and Sb satisfy the following condition: Sa−Sb≧−10.

9. The porous film according to claim 8, wherein the Gurley permeability of the porous film is from 1 to 25 seconds per 100 cc.

10. The porous film according to claim 8, wherein the Gurley permeability of the porous film is from 1 to 18 seconds per 100 cc.

11. The porous film according to claim 8, wherein the film has an average porosity $C^1$ of from 60% to 80% at one surface, and an average porosity $C^2$ of from 60% to 80% at the other surface.

* * * * *